US012038734B2

(12) United States Patent
Schuljak et al.

(10) Patent No.: US 12,038,734 B2
(45) Date of Patent: Jul. 16, 2024

(54) MANAGING ACCESS FOR A MANUFACTURING SYSTEM

(71) Applicant: Bell Textron Inc., Fort Worth, TX (US)

(72) Inventors: Patricia Schuljak, Mansfield, TX (US); Serge Pomerleau, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 297 days.

(21) Appl. No.: 17/519,181

(22) Filed: Nov. 4, 2021

(65) Prior Publication Data

US 2023/0136570 A1    May 4, 2023

(51) Int. Cl.
  *G05B 19/406*    (2006.01)
  *G06F 21/62*     (2013.01)

(52) U.S. Cl.
  CPC ....... *G05B 19/406* (2013.01); *G06F 21/6218* (2013.01); *G05B 2219/34282* (2013.01)

(58) Field of Classification Search
  CPC ........ G05B 19/406; G05B 2219/34282; G06F 21/6218
  See application file for complete search history.

(56) References Cited

U.S. PATENT DOCUMENTS

| 9,448,553 | B2 * | 9/2016 | De Schepper | G05B 19/414 |
| 9,619,631 | B1 * | 4/2017 | DeHaan | G06F 21/31 |
| 11,075,952 | B2 * | 7/2021 | Ramachandran | H04L 63/20 |
| 11,088,993 | B2 * | 8/2021 | Wardell | H04L 67/563 |
| 11,243,508 | B2 * | 2/2022 | Hadeli | G05B 19/406 |
| 2011/0126197 | A1 * | 5/2011 | Larsen | G06F 21/31 718/1 |
| 2015/0127562 | A1 * | 5/2015 | Heller | G06Q 30/018 705/317 |
| 2015/0314697 | A1 * | 11/2015 | Chen | B60L 58/10 340/455 |
| 2016/0340867 | A1 * | 11/2016 | Matsuzaki | A01B 69/008 |
| 2018/0034856 | A1 * | 2/2018 | Mallya | H04L 63/105 |
| 2018/0316654 | A1 * | 11/2018 | Hardee | H04L 63/105 |

(Continued)

FOREIGN PATENT DOCUMENTS

EP    1590760 B1    3/2010

*Primary Examiner* — Gary S Gracia
(74) *Attorney, Agent, or Firm* — Akona IP PC (57) ABSTRACT

Various implementations directed to managing access for a manufacturing system are provided. In one implementation, a method may include receiving access management request data at an automated provisioning system of an entity. The method may also include determining ready task data based on the received access management request data. The method may further include transmitting provisioning request data based on the determined ready task data. The method may additionally include transmitting status request data after a predetermined amount of time. The method may also include receiving the external status data. The method may further include determining generic status data based on the received external status data. The method may additionally include performing access management operations based on the determined generic status data. The method may also include manufacturing physical components using the manufacturing system based on the access management operations.

20 Claims, 2 Drawing Sheets

(56) References Cited

U.S. PATENT DOCUMENTS

| | | | | |
|---|---|---|---|---|
| 2018/0316676 A1* | 11/2018 | Gilpin | ............... | H04L 9/0891 |
| 2018/0321661 A1* | 11/2018 | Main-Reade | ...... | G05B 19/4185 |
| 2019/0019187 A1* | 1/2019 | Miller | ............... | G06Q 20/40 |
| 2019/0311430 A1* | 10/2019 | Raleigh | ............... | G06Q 40/03 |
| 2020/0076806 A1* | 3/2020 | Nassar | ............... | H04L 63/0892 |
| 2020/0322884 A1* | 10/2020 | Di Girolamo | ........ | H04W 12/37 |
| 2021/0103649 A1* | 4/2021 | Korus | ............... | G06F 9/4881 |
| 2021/0117557 A1* | 4/2021 | Al-Shanqity | ....... | G06F 21/6218 |
| 2021/0136072 A1* | 5/2021 | Hutcherson | ......... | H04L 63/0892 |
| 2021/0218748 A1* | 7/2021 | Morin | ............... | H04L 63/102 |
| 2021/0226956 A1* | 7/2021 | Wei | ............... | H04L 63/108 |
| 2021/0288970 A1* | 9/2021 | Chawla | ............... | H04L 63/20 |
| 2021/0374735 A1* | 12/2021 | Knox | ............... | G06Q 20/3674 |
| 2023/0136570 A1* | 5/2023 | Schuljak | ............. | G05B 19/406 |
| | | | | 700/108 |
| 2023/0195877 A1* | 6/2023 | Korus | ............... | H04L 63/0807 |
| | | | | 726/4 |

\* cited by examiner

MANAGING ACCESS FOR A MANUFACTURING SYSTEM

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

An entity may operate a number of systems that can be accessed by multiple users of the entity. These systems may include any software-based system and/or any hardware-based system known to those skilled in the art. For example, the systems may include a manufacturing system that is configured to communicate with one or more machines, where the manufacturing system may use the one or more machines to produce one or more physical components.

The users of the entity may include one or more employees, one or more contractors, one or more partners, one or more customers, one or more end-consumers, and/or the like. In some scenarios, each user may have one or more access privileges with respect to the systems of the entity, where the one or more access privileges may dictate what the user is allowed to do in the systems. In such scenarios, the entity may manage the access privileges for its users and systems using an identity and access management (IAM) system.

SUMMARY

Described herein are implementations of various technologies relating to managing access for a manufacturing system. In one implementation, a method may include receiving access management request data at an automated provisioning system of an entity, where the access management data includes data relating to a request to manage one or more access privileges with respect to a manufacturing system of the entity. The method may also include determining ready task data for the manufacturing system based on the received access management request data, where the ready task data includes data relating to one or more provisioning tasks to be performed for the manufacturing system. The method may further include transmitting provisioning request data to the manufacturing system based on the determined ready task data, where the provisioning request data includes data relating to a request for the manufacturing system to perform the one or more provisioning tasks. The method may additionally include transmitting status request data to the manufacturing system after a predetermined amount of time, where the status request data includes data relating to a request for the manufacturing system to provide external status data for the one or more provisioning tasks. The method may also include receiving the external status data from the manufacturing system, where the external status data includes data relating to one or more external statuses for the one or more provisioning tasks. The method may further include determining generic status data for the manufacturing system based on the received external status data, where the generic status data includes data relating to one or more generic statuses that correspond to the one or more external statuses. The method may additionally include performing one or more access management operations based on the determined generic status data. The method may also include manufacturing one or more physical components using the manufacturing system based on the one or more access management operations.

In another implementation, a method may include receiving access management request data at an automated provisioning system of an entity, where the access management data includes data relating to a request to manage one or more access privileges with respect to a manufacturing system of the entity. The method may also include determining ready task data for the manufacturing system based on the received access management request data, where the ready task data includes data relating to one or more provisioning tasks to be performed for the manufacturing system. The method may further include transmitting provisioning request data to the manufacturing system based on the determined ready task data, where the provisioning request data includes data relating to a request for the manufacturing system to perform the one or more provisioning tasks. The method may additionally include transmitting status request data to the manufacturing system after a predetermined amount of time, where the status request data includes data relating to a request for the manufacturing system to provide external status data for the one or more provisioning tasks. The method may also include receiving the external status data from the manufacturing system, where the external status data includes data relating to one or more external statuses for the one or more provisioning tasks. The method may further include determining generic status data for the manufacturing system based on the received external status data, where the generic status data includes data relating to one or more generic statuses that correspond to the one or more external statuses. The method may additionally include performing one or more access management operations based on the determined generic status data.

In yet another implementation, a method may include receiving access management request data at an automated provisioning system of an entity, wherein the access management data comprises data relating to a request to manage one or more access privileges with respect to an external system of the entity. The method may also include determining ready task data for the external system based on the received access management request data, wherein the ready task data comprises data relating to one or more provisioning tasks to be performed for the external system. The method may further include transmitting provisioning request data to the external system based on the determined ready task data, wherein the provisioning request data comprises data relating to a request for the external system to perform the one or more provisioning tasks. The method may additionally include transmitting status request data to the external system after a predetermined amount of time, wherein the status request data comprises data relating to a request for the external system to provide external status data for the one or more provisioning tasks. The method may also include receiving the external status data from the external system, wherein the external status data comprises data relating to one or more external statuses for the one or more provisioning tasks. The method may further include determining generic status data for the external system based on the received external status data, wherein the generic status data comprises data relating to one or more generic statuses that correspond to the one or more external statuses. The method may additionally include performing one or more access management operations based on the determined generic status data.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations directed to managing access for a manufacturing system will now be described in the following paragraphs with reference to FIGS. 1-3.

As is known, an entity may operate one or more external systems that can be accessed by multiple users of the entity. An entity may be any organization known to those skilled in the art, such as a business, a nonprofit organization, a government agency, an enterprise, and/or the like. The one or more external systems operated by the entity may include any software-based system and/or any hardware-based system known to those skilled in the art. The one or more external systems may be utilized in one or more on-premises environments of the entity, one or more cloud-computing environments accessible by the entity, or both.

In particular, the one or more external systems may include one or more software application systems, one or more network systems, one or more general computing systems, one or more server systems, one or more virtual computing systems, and/or any other external system known to those skilled in the art. In some instances, a software application system operated by the entity may be an enterprise resource planning (ERP) system, a product lifecycle management (PLM) system, a security system for a physical location, a database management system, a directory service system, a computer-aided design (CAD) system, a computer-aided engineering (CAE) system, a manufacturing system, and/or the like. For example, the entity may operate a manufacturing system (e.g., a computer-aided manufacturing (CAM) system) that is configured to communicate with one or more computer numerical control (CNC) machines. In such an example, the entity may use the manufacturing system and the one or more CNC machines to manufacture one or more physical components (e.g., one or more parts, one or more tools, and/or the like).

The users of the entity may include one or more employees, one or more contractors, one or more partners, one or more customers, one or more end-consumers, and/or the like. In addition, each user may have one or more access privileges with respect to the one or more external systems. An access privilege for a user may define a level of access that is permitted for the user with respect to an external system. In particular, an access privilege for a user with respect to an external system may represent that the user has permission to perform one or more specific actions in the external system. Thus, the one or more access privileges of a user may dictate what the user is allowed to do in the one or more external systems. For example, an access privilege for a user may represent that the user has permission to access one or more specific modules of a CAM system. In another example, an access privilege for a user may represent that the user has permission to access one or more specific databases of an ERP system.

The entity may use an identity and access management (IAM) system to manage the access privileges for its users with respect to the one or more external systems. The IAM system may include any software-based system and/or any hardware-based system known to those skilled in the art. In particular, the entity may use the IAM system to provision (i.e., grant) an access privilege for a user with respect to an external system. Similarly, the entity may use the IAM system to deprovision (i.e., deny and/or revoke) an access privilege for a user with respect to an external system.

Further, the entity may use the IAM system to manage the access privileges for its users with respect to the one or more external systems by using the IAM system to identify one or more provisioning tasks for the one or more external systems. In particular, performing a provisioning task for an external system may lead to a provisioning or deprovisioning of one or more access privileges for a user with respect to the external system. A provisioning task may be any task known to those skilled in the art, including, but not limited to, the following: creating a profile for a user at an external system, where the profile includes one or more access privileges; removing a profile for a user at an external system, where the profile includes one or more access privileges; adding one or more access privileges to a profile of a user at an external system; removing one or more access privileges from a profile of a user at an external system; adding a role and/or a group membership to a profile of a user at an external system, where the role and/or group membership is associated with one or more access privileges at the external system; and/or removing a role and/or group membership from a profile of a user at an external system.

By using the IAM system to manage the access privileges for its users in such a manner, the entity may be able to provision an appropriate access privilege to an appropriate user as needed. Moreover, the entity may be able to limit unauthorized accesses to the one or more external systems, thereby enhancing the security of the external systems and improving policy compliance.

In some instances, one or more individuals associated with the entity may manually perform the one or more provisioning tasks for the one or more external systems that were identified using the IAM system. The one or more individuals may include one or more managers, one or more administrators, and/or any other individual with appropriate access to the IAM system and the external system. In one example, an administrator of a business may use the IAM system to identify a provisioning task for a CAM system, where the provisioning task may be to add a role to a profile of an employee at the CAM system. The administrator may then manually add the role to the profile of the employee at the CAM system. Upon manually completing this provisioning task, one or more access privileges associated with the role may be provisioned for the employee at the CAM system. However, manually performing the provisioning tasks in such a manner may lead to more opportunities for human error when managing the access privileges for the external systems, which may lead to an increased risk of unauthorized accesses to the one or more external systems. In addition, access privileges may need to be managed (e.g., created, added, or removed) on a frequent basis and/or in large quantities, such that manually performing the provisioning tasks for these access privileges may require significant resources (e.g., time, labor costs, and/or the like) and may lead to decreased productivity by the entity. In other instances, the entity may utilize a software application, such as a connector application, to automate the performance of one or more provisioning tasks identified using the IAM system for a particular external system. However, the connector application may be specifically created and/or customized to facilitate communication between only the IAM system and that particular external system. Thus, the entity would need to create and/or customize a connector application for each external system that the entity operates, which may require significant resources (e.g., time, labor costs, and/or the like) and may lead to decreased productivity by the entity.

In view of the above, various implementations for managing access for a manufacturing system are described herein. In one implementation, an automated provisioning system of an entity may receive a request to manage one or more access privileges with respect to the manufacturing system. Based on the request, the automated provisioning system may identify one or more provisioning tasks that are ready to be performed. The automated provisioning system may then transmit a request for the manufacturing system to perform the one or more provisioning tasks. After a period of time, the automated provisioning system may transmit a request that the manufacturing system provide one or more external statuses regarding the one or more provisioning tasks. The automated provisioning system may, in response, receive the one or more external statuses from the manufacturing system. The automated provisioning system may then determine one or more generic statuses for the one or more provisioning tasks based on the one or more received external statuses. Based on the one or more generic statuses, the automated provisioning system may perform one or more access management operations with respect to the one or more provisioning tasks. Though various implementations are described below with respect to a manufacturing system, those skilled in the art will understand that the various implementations may also be applied to any external system known in the art.

I. System

Figure 1:
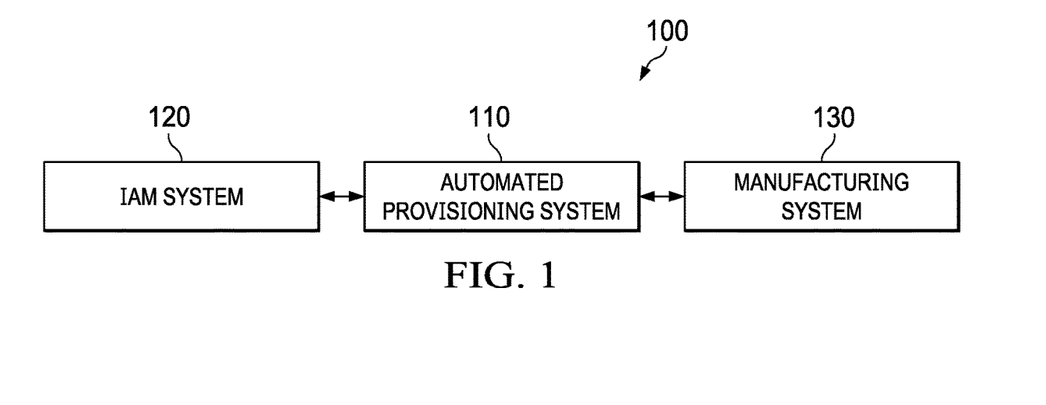
FIG. 1 illustrates a schematic diagram of a system using an automated provisioning system in accordance with implementations of various techniques described herein.

FIG. 1 illustrates a schematic diagram of a system 100 using an automated provisioning system 110 in accordance with implementations of various techniques described herein. The system 100 may include the automated provisioning system 110, an IAM system 120, and a manufacturing system 130. In some implementations, the system 100 may also include one or more databases (not shown), where the one or more databases may be part of, and/or configured to be accessed by, the automated provisioning system 110, the IAM system 120, and/or the manufacturing system 130.

Each element (i.e., the automated provisioning system 110, the IAM system 120, or the manufacturing system 130) of the system 100 may be in communication with at least one other element of the system 100 using any technique known to those skilled in the art. In some implementations, the automated provisioning system 110, the IAM system 120, and/or the manufacturing system 130 may communicate with one another using one or more networks (not shown). A network may include a local area network (LAN), a wide area network (WAN) (e.g., the Internet), a mobile network, a virtual network, a public network, a private network, and/or any other network known in the art capable of supporting communication among two or more of the elements of the system 100.

As similarly discussed above, an entity (not shown) may operate the manufacturing system 130, where the manufacturing system 130 may be accessed by multiple users (not shown) of the entity. As noted above, the entity may be any organization known to those skilled in the art, such as a business, a nonprofit organization, a government agency, an enterprise, and/or the like. In particular, the manufacturing system 130 may be operated by the entity to manufacture one or more physical components (e.g., one or more parts, one or more tools, and/or the like).

The manufacturing system 130 may be a software-based system, a hardware-based system, or combinations thereof. For example, the manufacturing system 130 may be the CAM system mentioned above. In addition, the manufacturing system 130 may include, and/or may be implemented using, one or more computing systems (not shown). The one or more computing systems may include any computing system known to those skilled in the art, including, but not limited to, the following: one or more software application systems, one or more network systems, one or more general computing systems, one or more server systems, one or more virtual computing systems, and/or one or more cloud computing systems. Various implementations of the one or more computing systems are discussed later with respect to FIG. 3. In some implementations, the manufacturing system 130 may be utilized in one or more on-premises environments of the entity, one or more cloud-computing environments accessible by the entity, or both.

The manufacturing system 130 may be used by the entity to manufacture a physical component using any technique known to those skilled in the art. In one implementation, the entity may provide a CAD system design of a physical component to the manufacturing system 130 (e.g., a CAM system). The manufacturing system 130 may be configured to then generate instructions for one or more CNC machines (not shown) based on the CAD system design. In particular, the manufacturing system 130 may communicate the instructions to the one or more CNC machines using any technique known to those skilled in the art, including those mentioned above. The one or more CNC machines may then manufacture the physical component based on the instructions from the manufacturing system 130. A CNC machine may be any machine known in the art that is configured to use such instructions to control a process for transforming raw material (e.g., metal, plastic, and/or the like) into a defined shape via one or more physical actions, where such actions may include cutting, drilling, and/or boring the raw material. In a further implementation, the manufacturing system 130 may generate the instructions for the one or more CNC machines based on both the CAD system design and input data from an individual (e.g., a manufacturing engineer) of the entity.

As noted above, the users associated with the entity may include one or more employees, one or more contractors, one or more partners, one or more customers, one or more end-consumers, and/or the like. And as similarly discussed above, each user may have one or more access privileges with respect to the manufacturing system 130. The one or more access privileges may be similar to the access privileges discussed above. In particular, an access privilege for a user with respect to the manufacturing system 130 may represent that the user has permission to perform one or more specific actions in the manufacturing system 130. For example, an access privilege for a user may represent that the user has permission to access a software module of the manufacturing system 130 that is used to generate instructions for a particular CNC machine.

Further, and as similarly discussed above, the entity may use the IAM system 120 to manage the access privileges for its users with respect to the manufacturing system 130. In particular, the entity may use the IAM system 120 to provision and/or deprovision an access privilege for a user with respect to the manufacturing system 130. The IAM system 120 may be a software-based system, a hardware-based system, or combinations thereof. In addition, the IAM system 120 may include, and/or may be implemented using, one or more computing systems (not shown). The one or more computing systems may be similar to the computing systems mentioned above. Again, various implementations of the one or more computing systems are discussed later with respect to FIG. 3. In some implementations, the IAM system 120 may be utilized in one or more on-premises environments of the entity, one or more cloud-computing environments accessible by the entity, or both. In a further implementation, the IAM system 120 may include one or more IAM databases (not shown) that are configured to be accessed by the automated provisioning system 110, as discussed below. In another implementation, the entity may also use the IAM system 120 to authenticate the users, authorize the users, manage one or more directory services, log usages of the access privileges, perform auditing of the access privileges, and/or the like.

Similar to the discussion above, the entity may use the IAM system 120 to manage the access privileges for its users with respect to the manufacturing system 130 by using the IAM system 120 to identify one or more provisioning tasks for the manufacturing system 130. The one or more provisioning tasks may be similar to the provisioning tasks mentioned above. In particular, performing a provisioning task for the manufacturing system 130 may lead to a provisioning or deprovisioning of one or more access privileges for a user with respect to the manufacturing system 130. In one implementation, data corresponding to the one or more provisioning tasks may be stored in the one or more IAM databases mentioned above. In one such implementation, one or more individuals associated with the entity (e.g., one or more managers, one or more administrators, and/or the like) may provide this data to the IAM system 120 for storage in the one or more IAM databases. In another implementation, the IAM system 120 may store this data in the one or more IAM databases after the one or more provisioning tasks have been approved by the one or more individuals associated with the entity.

In one implementation, the entity may use the automated provisioning system 110 to perform one or more of the provisioning tasks for the manufacturing system 130. The automated provisioning system 110 may be a software-based system, a hardware-based system, or combinations thereof. In addition, the automated provisioning system 110 may include, and/or may be implemented using, one or more computing systems (not shown). The one or more computing systems may be similar to the computing systems mentioned above. Again, various implementations of the one or more computing systems are discussed later with respect to FIG. 3. In some implementations, the automated provisioning system 110 may be utilized in one or more on-premises environments of the entity, one or more cloud-computing environments accessible by the entity, or both.

As further explained below, the automated provisioning system 110, through its interactions with the IAM system 120 and the manufacturing system 130, may be used to identify the one or more provisioning tasks, transmit a request for the manufacturing system 130 to perform the one or more provisioning tasks, transmit a request that the manufacturing system 130 provide one or more external statuses, receive the one or more external statuses, determine one or more generic statuses for the one or more provisioning tasks, and perform one or more access management operations with respect to the one or more provisioning tasks.

Moreover, although the system 100 is presented in one arrangement, other implementations may include one or more elements of the system 100 in different arrangements and/or with additional elements. For example, though one manufacturing system 130 is shown in FIG. 1, those skilled in the art will understand that the implementations described herein may be applied to scenarios in which multiple manufacturing systems may be used. In another example, those skilled in the art will understand that the system 100 may include one or more other external systems along with, or in place of, the manufacturing system 130.

II. Operation

In operation, the system 100 may be used to manage access for the manufacturing system 130. In particular, one or more elements of the system 100 (e.g., the automated provisioning system 110) may be used to receive a request to manage one or more access privileges with respect to the manufacturing system 130, identify one or more provisioning tasks associated with the manufacturing system 130, transmit a request for the manufacturing system 130 to perform the one or more provisioning tasks, transmit a request that the manufacturing system 130 provide one or more external statuses regarding the one or more provisioning tasks, receive the one or more external statuses from the manufacturing system 130, determine one or more generic statuses for the one or more provisioning tasks based on the one or more received external statuses, and perform one or more access management operations with respect to the one or more provisioning tasks based on the one or more generic statuses.

Initially, before the system 100 can be used to manage access for the manufacturing system 130, the automated provisioning system 110 may need to be authenticated by the IAM system 120 and/or the manufacturing system 130. In particular, the IAM system 120 and/or the manufacturing system 130 may initially need to validate that the automated provisioning system 110 is authorized to access one or more specific components (e.g., one or more databases) of the IAM system 120 and/or the manufacturing system 130. In one implementation, the automated provisioning system 110 may receive IAM credentials data from an individual (e.g., a manager, an administrator, and/or the like) associated with the entity, such as through an input device of a computing system associated with the automated provisioning system 110. The IAM credentials data may include any data that can be used to authenticate the automated provisioning system 110 with respect to the IAM system 120. The IAM credentials data may include data relating to any type of credential known to those skilled in the art, including, but not limited to, the following: a username, a password, a software token, a cryptographic key, and/or the like. After receiving the IAM credentials data, the automated provisioning system 110 may transmit the IAM credentials data to the IAM system 120. The IAM system 120 may then use the IAM credentials data to authenticate the automated provisioning system 110. Upon validating the IAM credentials data, the IAM system 120 may allow the automated provisioning system 110 to access one or more specific components of the IAM system 120. For example, upon authenticating the automated provisioning system 110, the IAM system 120 may allow the automated provisioning system 110 to access the one or more IAM databases mentioned above.

In another implementation, the automated provisioning system 110 may similarly receive external credentials data from an individual (e.g., a manager, an administrator, and/or the like) associated with the entity, such as through an input device of a computing system associated with the automated provisioning system 110. The external credentials data may include any data that can be used to authenticate the automated provisioning system 110 with respect to an external system (e.g., the manufacturing system 130). The external credentials data may include data relating to any type of credential known to those skilled in the art, including, but not limited to, the following: a username, a password, a software token, a cryptographic key, and/or the like. After receiving the external credentials data, the automated provisioning system 110 may transmit the external credentials data to the appropriate external system (e.g., the manufacturing system 130). The manufacturing system 130 may then use the external credentials data to authenticate the automated provisioning system 110. Upon validating the external credentials data, the manufacturing system 130 may allow the automated provisioning system 110 to access one or more specific components of the manufacturing system 130. For example, upon authenticating the automated provisioning system 110, the manufacturing system 130 may allow the automated provisioning system 110 to access one or more external databases associated with the manufacturing system 130, where the one or more external databases may include profile data for one or more users of the entity.

A. Access Management Request Data

After a successful authentication by the IAM system 120 and/or the manufacturing system 130, the automated provisioning system 110 may receive access management request data. The access management request data may include data relating to a request to manage one or more access privileges with respect to one or more external systems (e.g., the manufacturing system 130). In particular, the access management request data may include data that identifies the one or more external systems (e.g., the manufacturing system 130) for which the management of one or more access privileges is requested. For various implementations discussed below, the access management request data may include data relating to a request to manage one or more access privileges with respect to the manufacturing system 130.

In one implementation, the automated provisioning system 110 may receive the access management request data from an individual (e.g., a manager, an administrator, and/or the like) associated with the entity, such as through an input device of a computing system associated with the automated provisioning system 110. In another implementation, the automated provisioning system 110 may receive the access management request data from the IAM system 120, such as in response to a change in data stored in the one or more IAM databases. The data stored in the one or more IAM databases may include data corresponding to one or more provisioning tasks, data corresponding one or more directory services, and/or the like. For example, a change in data stored in the one or more IAM databases may include a change in data for the number of users employed by the entity, a change in data for one or more roles of the users of the entity, a change in data for the groups of users of the entity, and/or the like.

B. Ready Task Data

The automated provisioning system 110 may then communicate with the IAM system 120 to determine ready task data for the one or more external systems identified in the access management request data (e.g., the manufacturing system 130). The ready task data may include data relating to provisioning tasks that are ready to be performed for these one or more external systems (e.g., the manufacturing system 130). For various implementations discussed below, the ready task data may include data relating to provisioning tasks that are ready to be performed for the manufacturing system 130.

In one implementation, the automated provisioning system 110 may determine the ready task data based on the data stored in the one or more IAM databases. As mentioned above, data corresponding to provisioning tasks for the external systems of the entity may be stored in the one or more IAM databases. In particular, this stored data may correspond to all provisioning tasks that are designated to be performed for the external systems of the entity, including the manufacturing system 130. As is also noted above, one or more individuals associated with the entity (e.g., one or more managers, one or more administrators, and/or the like) may have previously provided this data to the IAM system 120 for storage in the one or more IAM databases. In addition, the IAM system 120 may have stored this data in the one or more IAM databases after the provisioning tasks had been approved by the one or more individuals associated with the entity. Further, having been previously authenticated by the IAM system 120, the automated provisioning system 110 may be configured to communicate with the IAM system 120 in order to access this data stored in the one or more IAM databases (i.e., the data corresponding to the provisioning tasks for the external systems).

Based on the data stored in the one or more IAM databases, the automated provisioning system 110 may identify the ready task data for the manufacturing system 130, where the ready task data may represent at least a subset of this stored data. In one implementation, the automated provisioning system 110 may identify the ready task data by identifying, at least, a subset of the stored data that corresponds to provisioning tasks for only the manufacturing system 130, as opposed to the provisioning tasks for other external systems. In one such implementation, the automated provisioning system 110 may identify this subset of the stored data based on the received access management request data, as the received access management request data may specifically identify the one or more external systems (e.g., the manufacturing system 130) for which the management of access privileges is requested. In another implementation, the automated provisioning system 110 may identify the ready task data by identifying, at least, a subset of the stored data that corresponds to provisioning tasks that are ready to be performed, that corresponds to provisioning tasks that have never been performed by an individual or the automated provisioning system 110, and/or the like. In yet another implementation, the automated provisioning system 110 may identify the ready task data by identifying, at least, a subset of the stored data that corresponds to provisioning tasks that are capable of being performed by the automated provisioning system 110. In particular, the automated provisioning system 110 may not be configured to perform every provisioning task, such as, for example, creating a profile for an administrator of the entity.

In some implementations, the automated provisioning system 110 may identify, the subset of the stored data, as described above, via one or more indicators in the one or more IAM databases. In particular, a respective indicator may be used to indicate, at least, a subset of the stored data that corresponds to provisioning tasks for only the manufacturing system 130, that corresponds to provisioning tasks that are ready to be performed, that corresponds to provisioning tasks that have never been performed by an individual or the automated provisioning system 110, that corresponds to provisioning tasks that are capable of being performed by the automated provisioning system 110, and/or the like. The one or more indicators in the one or more IAM databases may include one or more flag bits, one or more variables, and/or the like.

The provisioning tasks for the manufacturing system 130 that correspond to the ready task data may include any provisioning task known to those skilled in the art, including those mentioned above. For example, these provisioning tasks may include: creating a profile for a particular user (e.g., an employee) at the manufacturing system 130, where the profile includes one or more access privileges; removing a profile for a particular user at the manufacturing system 130, where the profile includes one or more access privileges; adding one or more access privileges to a profile of a particular user at the manufacturing system 130; removing one or more access privileges from a profile of a particular user at the manufacturing system 130; adding a role and/or a group membership to a profile of a particular user at the manufacturing system 130, where the role and/or group membership is associated with one or more access privileges at the manufacturing system 130; removing a role and/or group membership from a profile of a particular user at the manufacturing system 130; and/or updating the profile data associated with the manufacturing system 130 for multiple users in accordance with one or more databases, one or more directory services, and/or the like.

C. Provisioning Request Data

Based on the ready task data, the automated provisioning system 110 may then determine provisioning request data for the one or more external systems (e.g., the manufacturing system 130) identified in the access management request data. In one implementation, the provisioning request data may include data relating to a request that these one or more external systems (e.g., the manufacturing system 130) perform the provisioning tasks that correspond to the ready task data. In another implementation, the provisioning request data may include data relating to a request that these one or more external systems (e.g., the manufacturing system 130) perform a selection of the provisioning tasks that correspond to the ready task data. In one such implementation, this selection of the provisioning tasks may include provisioning tasks that are to be performed for a same user and/or group of users, concurrent provisioning tasks, and/or the like. For various implementations discussed below, the provisioning request data may include data relating to a request that the manufacturing system 130 perform the provisioning tasks that correspond to the ready task data.

In some implementations, the provisioning request data may also include command data for the manufacturing system 130. The command data may include data relating to commands that may be executed by a computing system associated with the manufacturing system 130, such that executing the commands may cause the manufacturing system 130 to perform the provisioning tasks that correspond to the ready task data. In such implementations, the commands may be in the form of computer-executable instructions. In one implementation, the automated provisioning system 110 may determine the command data for the provisioning request data based on the ready task data, where the ready task data may include data that identifies the commands. In another implementation, the automated provisioning system 110 may determine the command data for the provisioning request data based on the ready task data, where the ready task data may include data that can be mapped to the commands via one or more databases of the system 100.

After determining the provisioning request data as described above, the automated provisioning system 110 may transmit the provisioning request data to the manufacturing system 130. In particular, a computing system associated with the automated provisioning system 110 may transmit the provisioning request data to a computing system associated with the manufacturing system 130 using any technique known in the art, including those discussed above.

In one implementation, after transmitting the provisioning request data, the automated provisioning system 110 may access the one or more IAM databases. In such an implementation, the automated provisioning system 110 may provide an indication in the one or more IAM databases that the provisioning tasks corresponding to the provisioning request data are no longer ready to be performed, have been performed by an individual or the automated provisioning system 110, and/or the like. The automated provisioning system 110 may provide these indications using any technique known in the art, such as through the use of flag bits and/or variables in the one or more IAM databases. In another implementation, the automated provisioning system 110 may store a record of the transmitted provisioning request data in one or more databases of the system 100 (e.g., one or more IAM databases), where the record may include details regarding the time and date that the provisioning request data was transmitted, the provisioning tasks that correspond to the provisioning request data, the destination of the transmitted data (e.g., the manufacturing system 130), and/or the like.

D. Status Request Data

Once a predetermined amount of time has elapsed after transmitting the provisioning request data to the one or more identified external systems (e.g., the manufacturing system 130), the automated provisioning system 110 may then transmit status request data to these one or more external systems (e.g., the manufacturing system 130). The status request data may include data relating to a request that these one or more external systems (e.g., the manufacturing system 130) provide external status data for the provisioning tasks corresponding to the provisioning request data. For various implementations discussed below, the automated provisioning system 110 may transmit the status request data to the manufacturing system 130.

The external status data may include data relating to one or more external statuses for the provisioning tasks corresponding to the provisioning request data. In particular, an external status may indicate whether a particular provisioning task was successfully completed for the one or more identified external systems (e.g., the manufacturing system 130). In some implementations, each external system may provide one or more external statuses that are distinct from external statuses provided by other external systems. In further implementations, the external status data may also include reference data for the provisioning tasks that correspond to the provisioning request data, where the reference data may be generated by an external system (e.g., the manufacturing system 130). The reference data may be used to identify a log history and/or records relating to a particular provisioning task in one or more external databases of the external system. For various implementations discussed below, the external status data may include data relating to one or more external statuses for the provisioning tasks corresponding to the provisioning request data, where a respective external status may indicate whether one or more particular provisioning tasks were successfully completed for the manufacturing system 130.

The predetermined amount of time may be any amount of time (e.g., five minutes) and may be designated using the automated provisioning system 110. In one implementation, the predetermined amount of time may be designated based on input data provided to the automated provisioning system 110 by an individual (e.g., a manager, an administrator, and/or the like) associated with the entity, such as through an input device of a computing system associated with the automated provisioning system 110. In a further implementation, after transmitting the status request data to the manufacturing system 130, the automated provisioning system 110 may store a record of the transmitted status request data in the one or more databases of the system 100 (e.g., one or more IAM databases). The record may include details regarding the time and date that the status request data was transmitted, the provisioning tasks that correspond to the status request data, the destination of the transmitted data (e.g., the manufacturing system 130), and/or the like.

E. External Status Data

In response to transmitting the status request data, the automated provisioning system 110 may receive the external status data from the manufacturing system 130. In a further implementation, the automated provisioning system 110 may store a record of the received external status data in the one or more databases of the system 100 (e.g., one or more IAM databases). The record may include details regarding the time and date that the external status data was received, the provisioning tasks that correspond to the external status data, the origin of the received data (e.g., the manufacturing system 130), and/or the like.

F. Generic Status Data

The automated provisioning system 110 may then determine generic status data for the one or more identified external systems (e.g., the manufacturing system 130) based on the received external status data. As noted above, the external status data may vary for each external system of the entity. In particular, one or more external statuses that correspond to external status data transmitted by a particular external system may be distinct from one or more external statuses corresponding to external status data transmitted by another external system. In addition, one or more of these external statuses may be incompatible with the IAM system 120 and/or the automated provisioning system 110, such that these systems may be unable to further process the external status data.

Accordingly, the automated provisioning system 110 may translate the external status data (i.e., the data relating to one or more external statuses) to the generic status data. The generic status data may include data relating to one or more generic statuses, where each external status of the external status data corresponds to a particular generic status. In one implementation, the automated provisioning system 110 may use one or more databases of the system 100 (e.g., one or more IAM databases) to map each external status of the external status data to a particular generic status. In some implementations, each generic status may be compatible with the IAM system 120 and/or the automated provisioning system 110, such that these systems may be able to further process the data relating to the one or more generic statuses. In a further implementation, the number of generic statuses used by the automated provisioning system 110 may be less than the number of external statuses used by the automated provisioning system 110.

For various implementations below, the automated provisioning system 110 may use the one or more IAM databases to determine generic status data based on the external status data received from the manufacturing system 130. The generic statuses of the generic status data may include any number and/or type of status. In one implementation, the automated provisioning system 110 may use the one or more IAM databases to map each external status of the external status data received from the manufacturing system 130 to one of the following generic statuses: a completed status, a failed status, or a pending status. The completed status may indicate that the manufacturing system 130 successfully completed a provisioning task corresponding to a particular external status. The failed status may indicate that the manufacturing system 130 was unable to complete a provisioning task corresponding to a particular external status. The pending status may indicate that the manufacturing system 130 is currently in the process of performing a provisioning task corresponding to a particular external status.

In a further implementation, the automated provisioning system 110 may store a record of the determined generic status data in the one or more databases of the system 100 (e.g., one or more IAM databases). The record may include details regarding the time and date that the generic status data was determined, the provisioning tasks that correspond to the generic status data, the origin of the external status data (e.g., the manufacturing system 130) upon which the generic status data is based, and/or the like.

G. Access Management Operations

The automated provisioning system 110 may then perform one or more access management operations based on the determined generic status data. An access management operation may include any operation used to facilitate the management of access privileges for one or more external systems (e.g., the manufacturing system 130), such as the access privileges corresponding to the provisioning tasks performed for the one or more external systems (i.e., the provisioning tasks corresponding to the provisioning request data). For various implementations discussed below, the automated provisioning system 110 may perform the one or more access management operations based on the determined generic status data, where the one or more access management operations may correspond to the provisioning tasks performed for the manufacturing system 130 (i.e., the provisioning tasks corresponding to the provisioning request data transmitted to the manufacturing system 130).

In one implementation, for the provisioning tasks performed for the manufacturing system 130 that correspond to a generic status of completed status, the automated provisioning system 110 may provide one or more notifications that these provisioning tasks were successfully completed. For example, the automated provisioning system 110 may store success notifications data in the one or more IAM databases, where the success notifications data may indicate that these provisioning tasks were successfully completed. The success notifications data may include one or more flag bits, one or more variables, and/or one or more comments. In another example, the automated provisioning system 110 may transmit the success notifications data to the IAM system 120 and/or one or more individuals associated with the entity (e.g., one or more managers, one or more administrators, and/or the like), where the success notifications data may be in the form of notifying messages.

In another implementation, for the provisioning tasks performed for the manufacturing system 130 that correspond to a generic status of failed status, the automated provisioning system 110 may provide one or more notifications that these provisioning tasks were not successfully completed. For example, the automated provisioning system 110 may store failure notifications data in the one or more IAM databases, where the failure notifications data may indicate that these provisioning tasks were not successfully completed. The failure notifications data may include one or more flag bits, one or more variables, and/or one or more comments. In another example, the automated provisioning system 110 may transmit the failure notifications data to the IAM system 120 and/or one or more individuals associated with the entity (e.g., one or more managers, one or more administrators, and/or the like), where the failure notifications data may be in the form of notifying messages. In particular, the failure notifications data transmitted to an individual may indicate that assistance is needed to complete these provisioning tasks.

In yet another implementation, for the provisioning tasks performed for the manufacturing system 130 that correspond to a generic status of pending status, the automated provisioning system 110 may again allow the predetermined amount of time to elapse before again transmitting the status request data to the manufacturing system 130, where the transmitted status request data corresponds to these provisioning tasks. After again receiving the external status data, the generic status data for these provisioning tasks may again be determined. If one or more of these provisioning tasks continue to have a generic status of pending status, then the automated provisioning system 110 may again repeat the steps of transmitting the status request data for these provisioning tasks after the predetermined amount of time has elapsed. The automated provisioning system 110 may repeat the above steps for a provisioning task until the generic status for the provisioning task is determined to be either completed status or failed status.

Further, although operations above are discussed with respect to one arrangement of the system 100, those skilled in the art will understand that operation may be performed for other arrangements of the system 100 and/or with additional elements. For example, though one manufacturing system 130 is shown in FIG. 1, those skilled in the art will understand that the operations described herein may be applied to scenarios in which multiple manufacturing systems and/or other external systems are used.

Figure 2:
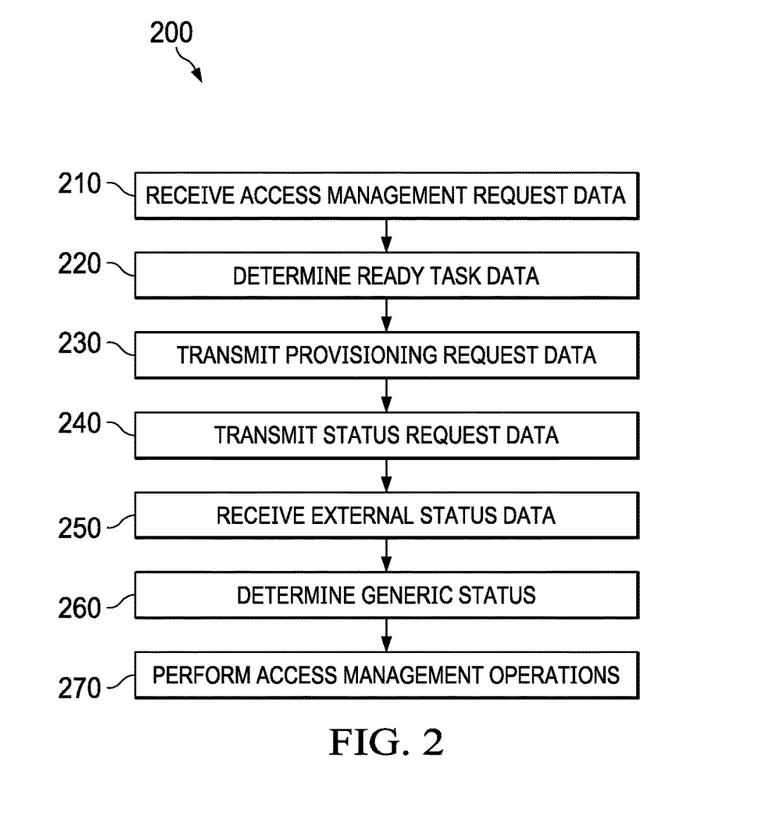
FIG. 2 illustrates a flow diagram of a method for using an automated provisioning system with respect to a manufacturing system of an entity in accordance with implementations of various techniques described herein.

FIG. 2 illustrates a flow diagram of a method 200 for using an automated provisioning system with respect to a manufacturing system of an entity in accordance with implementations of various techniques described herein. In one implementation, method 200 may be at least partially performed by the automated provisioning system, such as via the one or more computing systems discussed above. It should be understood that while method 200 indicates a particular order of execution of operations, in some implementations, certain portions of the operations might be executed in a different order. Further, in some implementations, additional operations or steps may be added to the method 200. Likewise, some operations or steps may be omitted.

At block 210, the automated provisioning system may receive access management request data. As noted above, the access management request data may include data relating to a request to manage one or more access privileges with respect to the manufacturing system. In one implementation, the automated provisioning system may receive the access management request data from an IAM system and/or an individual (e.g., a manager, an administrator, and/or the like) associated with the entity.

At block 220, the automated provisioning system may determine ready task data for the manufacturing system based on the access management request data. In particular, the automated provisioning system may communicate with the IAM system 120 to determine the ready task data. The ready task data may include data relating to provisioning tasks that are ready to be performed for the manufacturing system. In one implementation, the automated provisioning system may determine the ready task data based on data stored in one or more IAM databases of the IAM system.

At block 230, the automated provisioning system may transmit provisioning request data to the manufacturing system based on the ready task data. In one implementation, the automated provisioning system may determine the provisioning request data for the manufacturing system based on the access management data and the ready task data. The provisioning request data may include data relating to a request that the manufacturing system perform provisioning tasks that correspond to the ready task data.

At block 240, the automated provisioning system may transmit status request data to the manufacturing system after a predetermined amount of time. The status request data may include data relating to a request that the manufacturing system provide external status data for the provisioning tasks corresponding to the provisioning request data. The external status data may include data relating to one or more external statuses for the provisioning tasks corresponding to the provisioning request data.

At block 250, the automated provisioning system may receive the external status data from the manufacturing system. In particular, an external status of the external status data may indicate whether a particular provisioning task corresponding to the provisioning request data was successfully completed for the manufacturing system.

At block 260, the automated provisioning system may determine generic status data for the manufacturing system based on the received external status data. In one implementation, the automated provisioning system may translate the external status data (i.e., data relating to one or more external statuses) to the generic status data. The generic status data may include data relating to one or more generic statuses, where each external status of the external status data corresponds to a particular generic status. In one implementation, the automated provisioning system may use the one or more IAM databases to map each external status of the external status data to a particular generic status. The generic statuses of the generic status data may include a completed status, a failed status, or a pending status.

At block 270, the automated provisioning system may perform one or more access management operations based on the determined generic status data. The one or more access management operations may correspond to the provisioning tasks performed for the manufacturing system (i.e., the provisioning tasks corresponding to the provisioning request data transmitted to the manufacturing system). In one implementation, for the provisioning tasks performed for the manufacturing system that correspond to a generic status of completed status, the automated provisioning system may provide one or more notifications that these provisioning tasks were successfully completed. In another implementation, for the provisioning tasks performed for the manufacturing system that correspond to a generic status of failed status, the automated provisioning system may provide one or more notifications that these provisioning tasks were not successfully completed. In yet another implementation, for the provisioning tasks performed for the manufacturing system 130 that correspond to a generic status of pending status, the automated provisioning system may again allow the predetermined amount of time to elapse before again transmitting the status request data to the manufacturing system, where the transmitted status request data corresponds to these provisioning tasks. The automated provisioning system may repeat the above steps for a provisioning task until the generic status for the provisioning task is determined to be either completed status or failed status.

Accordingly, in view of the implementations discussed above with respect to FIGS. 1 and 2, an automated provisioning system may be used to manage one or more access privileges for one or more external systems of an entity, including a manufacturing system. In particular, the automated provisioning system may be used to perform one or more provisioning tasks for the one or more external systems, where a provisioning task may be used to provision or deprovision the access privileges for a user of the entity with respect to the one or more external systems.

By using the automated provisioning system to perform the provisioning tasks for the external systems, manual performances of the provisioning tasks can be minimized. Thus, opportunities for human error when managing the access privileges for the external systems may decrease, which may lead to a decreased risk of unauthorized accesses to the external systems. Further, by minimizing manual performances of the provisioning tasks through the use of the automated provisioning system described herein, the provisioning tasks may be completed using fewer resources (e.g., time, labor costs, and/or the like), which may lead to increased productivity for the entity.

As noted above, the automated provisioning system may be configured to determine generic status data for the external systems of the entity, which may be compatible with other systems of the entity (e.g., an IAM system). Because the automated provisioning system can be used with respect to various types of external systems, the entity can devote fewer resources (e.g., time, labor costs, and/or the like) to creating and/or customizing a connector application for each external system, which may also lead to increased productivity for the entity.

Further, the automated provisioning system may be configured to facilitate evaluation, recordkeeping, and/or troubleshooting with respect to the performances of the provisioning tasks for the external systems, such as by storing one or more records pertaining to transmitted provisioning request data, transmitted status request data, received external status data, and/or determined generic status data, as described above.

In addition, as noted above, the external systems may include a manufacturing system (e.g., a CAM system). In one implementation, upon completing one or more provisioning tasks using the automated provisioning system and/ or being notified of the completion of the one or more provisioning tasks, a user (e.g., an engineer) of the entity may be able to access one or more software modules of the manufacturing system. Using these software modules, the user may be able to provide and/or manage a CAD system design of a physical component for the manufacturing system. The manufacturing system may then generate instructions for one or more CNC machines based on the CAD system design. The manufacturing system may then communicate the instructions to the one or more CNC machines. The one or more CNC machines may then manufacture the physical component based on the instructions from the manufacturing system.

Though various implementations are described herein with respect to a manufacturing system, those skilled in the art will understand that the various implementations may also be applied to any external system known in the art. In one implementation, an external system may include: an ERP system, a PLM system, a security system for a physical location, a database management system, a directory service system, a CAD system, a CAE system, and/or the like.

III. Computing System

Figure 3:
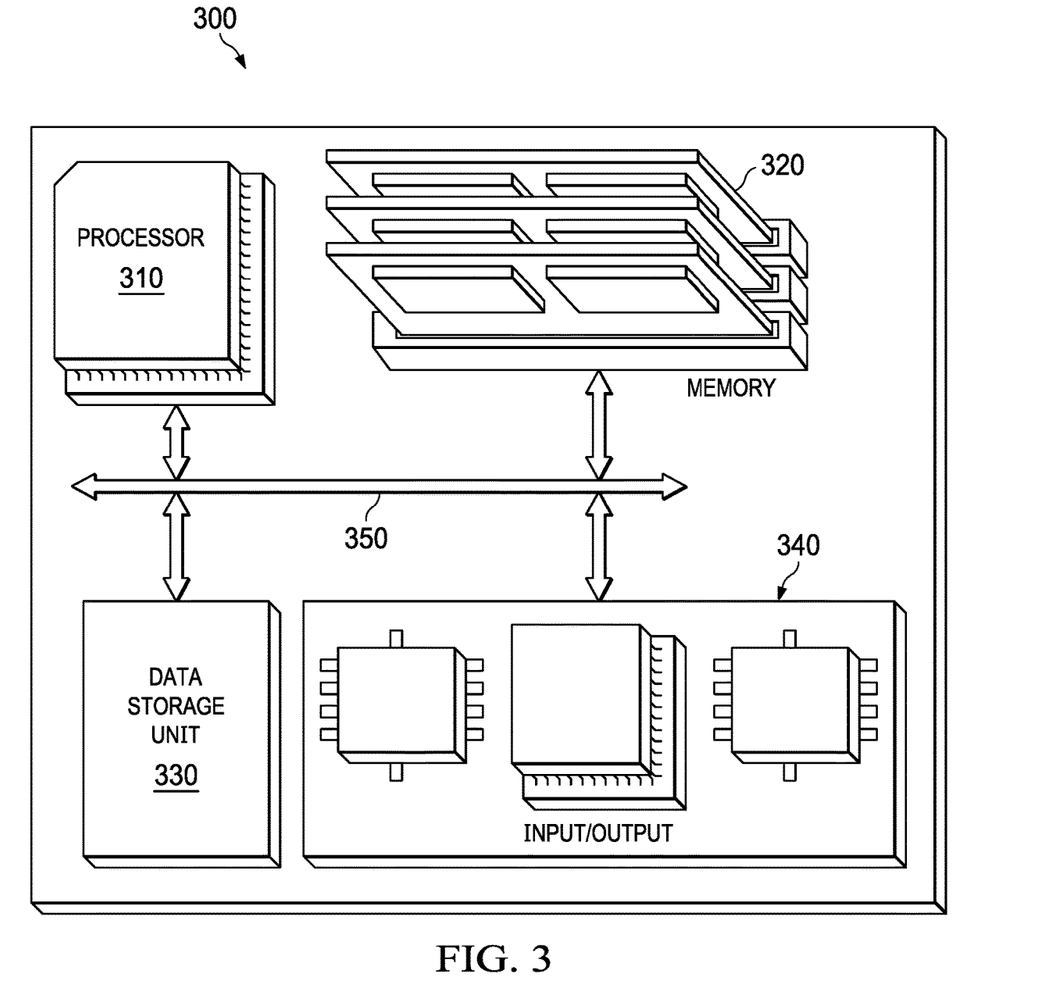
FIG. 3 illustrates a block diagram of a hardware configuration in which one or more various technologies described herein may be incorporated and practiced.

FIG. 3 illustrates a block diagram of a hardware configuration 300 in which one or more various technologies described herein may be incorporated and practiced. The hardware configuration 300 can be used to implement the one or more computing systems discussed above. The hardware configuration 300 can include a processor 310, a memory 320, a storage device 330, and an input/output device 340. Each of the components 310, 320, 330, and 340 can, for example, be interconnected using a system bus 350. The processor 310 can be capable of processing instructions for execution within the hardware configuration 300. In one implementation, the processor 310 can be a single-threaded processor. In another implementation, the processor 310 can be a multi-threaded processor. The processor 310 can be capable of processing instructions stored in the memory 320 or on the storage device 330.

The memory 320 can store information within the hardware configuration 300. In one implementation, the memory 320 can be a computer-readable medium. In one implementation, the memory 320 can be a volatile memory unit. In another implementation, the memory 320 can be a non-volatile memory unit.

In some implementations, the storage device 330 can be capable of providing mass storage for the hardware configuration 300. In one implementation, the storage device 330 can be a computer-readable medium. In various different implementations, the storage device 330 can, for example, include a hard disk device/drive, an optical disk device, flash memory or some other large capacity storage device. In other implementations, the storage device 330 can be a device external to the hardware configuration 300. Various implementations for the memory 320 and/or the storage device 330 are further discussed below.

The input/output device 340 can provide input/output operations for the hardware configuration 300. In one implementation, the input/output device 340 can include one or more display system interfaces, sensors and/or data transfer ports.

The subject matter of this disclosure, and/or components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output thereby tying the process to a particular machine, e.g., a machine programmed to perform the processes described herein. The processes and logic flows can also be performed by, and apparatus can also be implemented as, special purpose logic circuitry, e.g., an FPGA (field programmable gate array) or an ASIC (application specific integrated circuit).

Computer readable media (e.g., memory 320 and/or the storage device 330) suitable for storing computer program instructions and data may include all forms of non-volatile memory, media, and memory devices, including, by way of example, any semiconductor memory devices (e.g., EPROM, EEPROM, solid state memory devices, and flash memory devices); any magnetic disks (e.g., internal hard disks or removable disks); any magneto optical disks; and any CD-ROM and DVD-ROM disks. The processor and the memory can be supplemented by, or incorporated in, special purpose logic circuitry.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method, comprising:
    receiving access management request data at an automated provisioning system of an entity, wherein the access management request data comprises data relating to a request to manage one or more access privileges with respect to a manufacturing system of the entity;
    determining ready task data for the manufacturing system based on the received access management request data, wherein the ready task data comprises data relating to one or more provisioning tasks to be performed for the manufacturing system;
    receiving external status data from the manufacturing system, wherein the external status data comprises data relating to one or more external statuses for the one or more provisioning tasks;
    performing one or more access management operations based on generic status data, wherein the generic status data is based on the received external status data and comprises data relating to one or more generic statuses that correspond to the one or more external statuses;
    manufacturing one or more physical components using the manufacturing system based on the one or more access management operations.

2. The method of claim 1, wherein the one or more access privileges comprises permitted actions for one or more users of the entity with respect to the manufacturing system.

3. The method of claim 1, wherein the one or more provisioning tasks comprises:
    one or more tasks for provisioning the one or more access privileges for one or more users of the entity with respect to the manufacturing system;
    one or more tasks for deprovisioning the one or more access privileges for the one or more users with respect to the manufacturing system; or
    combinations thereof.

4. The method of claim 1, wherein determining the ready task data comprises identifying the ready task data within one or more databases of the entity.

5. The method of claim 4, wherein identifying the ready task data comprises identifying data relating to one or more provisioning tasks associated with the manufacturing system, one or more provisioning tasks ready to be performed, one or more provisioning tasks that have not been performed, one or more provisioning tasks configured to be performed using the automated provisioning system, or combinations thereof.

6. The method of claim 1, wherein the request for the manufacturing system to perform the one or more provisioning tasks comprises a request for the manufacturing system to perform a selection of the one or more provisioning tasks.

7. The method of claim 1, wherein a respective external status indicates whether a respective provisioning task was successfully completed for the manufacturing system.

8. The method of claim 1, further comprising:
    transmitting status request data to the manufacturing system after a predetermined amount of time, wherein the status request data comprises data relating to a request for the manufacturing system to provide external status data for the one or more provisioning tasks; and
    determining the predetermined amount of time based on input data from a manager or administrator of the entity.

9. The method of claim 1, wherein determining the generic status data comprises mapping the one or more external statuses to the one or more generic statuses using one or more databases of the entity.

10. The method of claim 1, wherein the one or more generic statuses comprises a completed status indicating that the manufacturing system successfully completed a respective provisioning task, and wherein one or more access management operations comprises providing one or more notifications that the manufacturing system successfully completed the respective provisioning task.

11. The method of claim 10, wherein manufacturing the one or more physical components comprises:
    in response to the one or more notifications, providing the one or more access privileges for a user of the entity with respect to the manufacturing system;
    receiving data corresponding to a computer-aided design for the one or more physical components;
    generating one or more instructions for one or more computer numerical control machines based on the data corresponding to the computer-aided design;
    transmitting the one or more instructions to the one or more computer numerical control machines; and
    manufacturing the one or more physical components based on the one or more instructions.

12. The method of claim 1, wherein the one or more generic statuses comprises a failed status indicating that the manufacturing system was unable to complete a respective provisioning task, and wherein one or more access management operations comprises providing one or more notifications that the manufacturing system was unable to complete the respective provisioning task.

13. The method of claim 1, further comprising transmitting provisioning request data to the manufacturing system based on the determined ready task data, wherein the provisioning request data comprises data relating to a request for the manufacturing system to perform the one or more provisioning tasks, wherein the one or more generic statuses comprises a pending status indicating that the manufacturing system is in the process of performing a respective provisioning task, and wherein one or more access management operations comprises periodically transmitting status request data to the manufacturing system after a predetermined amount of time until the one or more generic statuses for the respective provisioning task comprises a completed status or a failed status.

14. The method of claim 1, further comprising:
    transmitting provisioning request data to the manufacturing system based on the determined ready task data, wherein the provisioning request data comprises data relating to a request for the manufacturing system to perform the one or more provisioning tasks; and
    storing one or more records in one or more databases of the entity, wherein the one or more records correspond to the transmitted provisioning request data, the transmitted status request data, the received external status data, the determined generic status data, or combinations thereof.

15. The method of claim 1, wherein the manufacturing system comprises a computer-aided manufacturing system.

16. A method, comprising:
- receiving access management request data at an automated provisioning system of an entity, wherein the access management request data comprises data relating to a request to manage one or more access privileges with respect to an external system of the entity;
- determining ready task data for the external system based on the received access management request data, wherein the ready task data comprises data relating to one or more provisioning tasks to be performed for the external system;
- transmitting provisioning request data to the external system based on the determined ready task data, wherein the provisioning request data comprises data relating to a request for the external system to perform the one or more provisioning tasks;
- transmitting status request data to the external system after a predetermined amount of time, wherein the status request data comprises data relating to a request for the external system to provide external status data for the one or more provisioning tasks;
- receiving the external status data from the external system, wherein the external status data comprises data relating to one or more external statuses for the one or more provisioning tasks;
- determining generic status data for the external system based on the received external status data, wherein the generic status data comprises data relating to one or more generic statuses that correspond to the one or more external statuses; and
- performing one or more access management operations based on the determined generic status data.

17. The method of claim 16, wherein the external system comprises an enterprise resource planning system, a product lifecycle management system, a security system for a physical location, a database management system, a directory service system, a computer-aided design system, or a computer-aided engineering system.

18. One or more tangible, non-transitory computer-readable storage media having stored thereon instructions executable by a processor to cause the processor to perform operations comprising:
- receiving access management request data at an automated provisioning system of an entity, wherein the access management data comprises data relating to a request to manage one or more access privileges with respect to a manufacturing system of the entity;
- determining ready task data for the manufacturing system based on the received access management request data, wherein the ready task data comprises data relating to one or more provisioning tasks to be performed for the manufacturing system;
- receiving external status data from the manufacturing system, wherein the external status data comprises data relating to one or more external statuses for the one or more provisioning tasks;
- determining generic status data for the manufacturing system based on the received external status data, wherein the generic status data comprises data relating to one or more generic statuses that correspond to the one or more external statuses; and
- performing one or more access management operations based on the determined generic status data, wherein the generic status data is based on the received external status data and comprises data relating to one or more generic statuses that correspond to the one or more external statuses.

19. The one or more tangible, non-transitory computer-readable storage media of claim 18, wherein the one or more access privileges comprises permitted actions for one or more users of the entity with respect to the manufacturing system.

20. The one or more tangible, non-transitory computer-readable storage media of claim 18, wherein the one or more provisioning tasks comprise:
- one or more tasks for provisioning the one or more access privileges for one or more users of the entity with respect to the manufacturing system;
- one or more tasks for deprovisioning the one or more access privileges for the one or more users with respect to the manufacturing system; or
- combinations thereof.

* * * * *